Nov. 15, 1932.  G. S. FABER  1,887,804
DIFFERENTIAL INDICATING GAUGE
Filed Nov. 30, 1928   2 Sheets-Sheet 1

Witness:
William P. Kilroy

Inventor:
Guy S. Faber
By Hill & Hill
Attys

Nov. 15, 1932.  G. S. FABER  1,887,804
DIFFERENTIAL INDICATING GAUGE
Filed Nov. 30, 1928    2 Sheets-Sheet 2
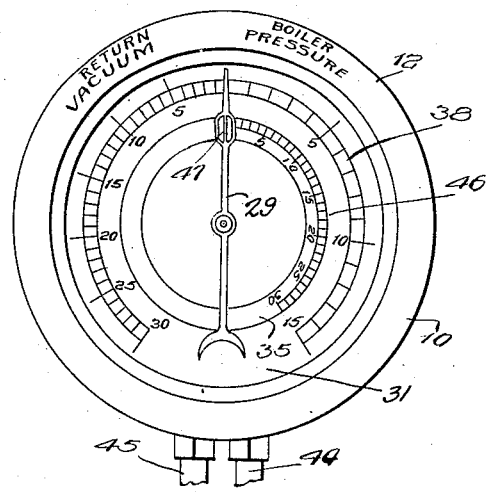
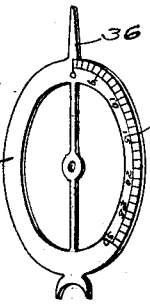
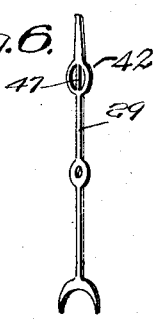

Patented Nov. 15, 1932

1,887,804

UNITED STATES PATENT OFFICE

GUY S. FABER, OF CHICAGO, ILLINOIS, ASSIGNOR, BY MESNE ASSIGNMENTS, TO JAS. P. MARSH CORPORATION, OF CHICAGO, ILLINOIS, A CORPORATION OF ILLINOIS

DIFFERENTIAL INDICATING GAUGE

Application filed November 30, 1928. Serial No. 322,907.

The invention relates to indicating gauges in which a pointer, or the like, moves over a graduated scale in accordance with physical, electrical, chemical, or the like, changes occuring in an energy controlling or distributing system, the rotatable pointer being operatively connected with said energy system to indicate the changing or static energy conditions therein.

The term energy controlling or distributing system as herein used is intended to apply to any means of controlling, regulating or distributing energy in any form, such for example as the energy of confined steam, all devices adapted to measure the various manifestations of electrical forces, measurements of humidity, etc., as exemplified in locomotive boilers, heating systems, power or light circuits, batteries, chemical reactions and the like.

More particularly the invention relates to indicator gauges of the class described in which two or more pointers or arrows are operatively connected with different points in the same or in connected energy controlling or distribution systems, it being the custom to mount such pointers in close proximity and preferably concentrically in the same housing, so that the operator may see at a glance the conditions which exist simultaneously at the different points of the system with which the different pointers are operatively connected.

Gauges of the class described are frequently used on steam energy systems such, for example, as a heating system or in a locomotive. They are also adapted for reading volts, amperes, etc. at different points of an electrical energy system or of other energy systems, whether physical chemical or the like, where it is desirable that the observer know the difference in conditions at selected points of the energy system. In such gauges as heretofore constructed the differences in energy conditions at the selected points at any given instant can be obtained only by the observer making as nearly simultaneous readings as possible of the two pointers which are respectively operatively connected with the selected points in the system, and then making calculations of the difference in the two readings. These calculations require time, even if made mentally, and there is always a possibility of an error in the readings or of a mistake in the calculated difference, or both.

In many such adaptations of gauges it is desirable that the difference in energy conditions at the selected points be kept as nearly a constant as possible, and this is particularly true of differential vacuum heating systems wherein my invention has one of its most important applications. Such systems work most efficiently by maintaining a constant differential of, for instance, two inches of a column of mercury and it is desirable in such cases that the vacuum pointer be kept a constant distance in advance of the pointer indicating the conditions in the boiler. The minor oscillations of the pointers make accurate readings difficult and this difficulty combined with the possibility of mistakes in readings and errors in calculating differences in readings makes it highly desirable that the differential be read directly on the indicating gauge, and one of the objects of the invention is the provision of an indicator gauge from which the energy conditions at selected points can be read direct and also the differential of the energy conditions at such selected points can be seen at a glance without the necessity of any mental calculations.

The invention may be applied to meters which are adapted to indicate or denote conditions at different points of an electrical energy system by means of which the voltage or ampere indications as well as their differential may be read direct from a meter properly connected with the system and scales graduated as desired.

The invention may take any one of several forms and in the embodiment shown consists primarily in providing an additional scale known as a differential scale and a pointer operable thereover from which the differential of the energy conditions at the selected points in an energy system can be read directly, the operator being able to see at a glance the actual existing difference in conditions at the selected points. The differential scale is shown as taking the form of a graduated annular ring which is rotatable with one of the concentrically mounted pointers, preferably the pointer which indicates the lowest energy conditions, as for instance, the back pressure or vacuum pointer in a steam system or the lowest reading of voltage, amperage or the like in an electrical energy system.

The differential scale may be graduated to correctly indicate the algebraic differences of the readings of the two pointers for the two selected points as for example in the case of a vacuum heating system where the boiler pressure is measured in pounds and the return pipe conditions are measured in inches of mercury column. When thus used the differential gauge will show the difference of conditions in pounds pressure, or the difference may be shown in inches of mercury column.

Many other objects and advantages of the construction herein shown and described will be obvious to those skilled in the art from the description herein given.

To this end my invention consists in the novel construction, arrangement and combination of parts herein shown and described, and more particularly pointed out in the claims.

In the drawings, wherein like reference characters indicate like or corresponding parts of one embodiment in which the principles of my invention are utilized to indicate the differential in steam pressure systems;

Fig. 4 is a front elevational view of a gauge provided with graduated scales from which both vacuum and high pressure conditions, as well as the differential between the two can be read; and Figs. 5 and 6 are detailed views of the pointer members.

Figure 1:
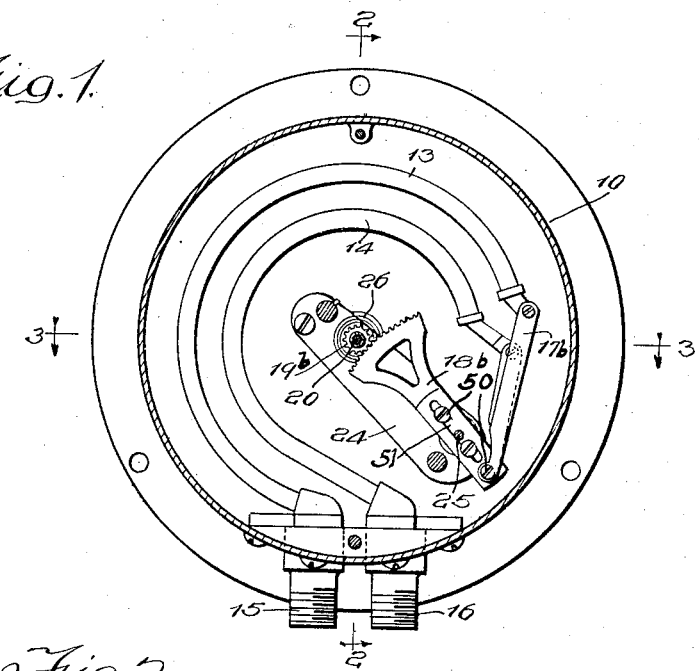
Figure 1 is a sectional view of a steam gauge embodying the principles of my invention, the view being taken along line 1—1 of Fig. 2.
Figure 2:
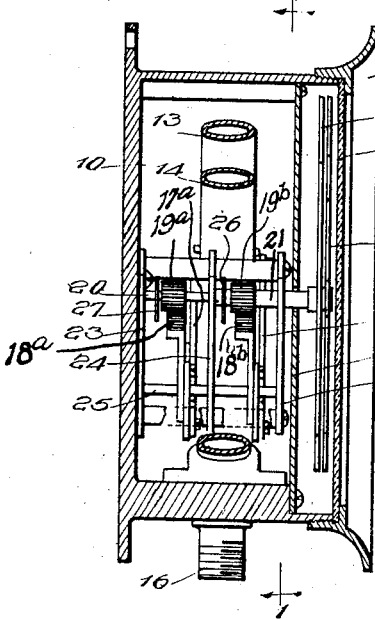
Fig. 2 is a sectional view along the line 2—2 of Fig. 1.
Figure 3:
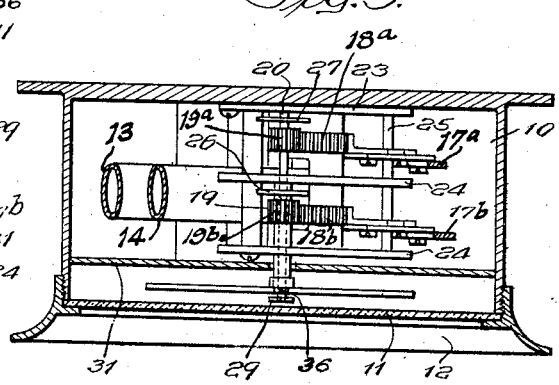
Fig. 3 is a sectional view along the line 3—3 of Fig. 1.

Referring now to the drawings, the numeral 10 generally designates a housing for a steam gauge which I have selected as illustrating one adaptation of my invention. The gauge 10 has a front glass plate 11 detachably secured in place by an annular ring 12. The ring 12 has a threaded connection with the main body of the housing 10, thereby enabling the ring to be easily removed for access to the housing.

A pair of Bourdon tubes 13 and 14 are mounted in the housing 10 and connected at their lower ends in the usual manner with threaded nipples 15 and 16 respectively. The nipples 15 and 16 provide threaded connections for pipes 45 and 44. The pipes 45 and 44, Fig. 4, respectively connect the Bourdon tubes 13 and 14 with selected points in a steam pressure system or the like, (not shown) at which points it is desirable to determine the pressure conditions. The Bourdon tubes 13 and 14 operate in the usual manner, being subjected to the varying degrees of pressure occurring in the pressure medium with which the springs are connected through the nipples and pipes, as above described and designated. When the tubes 13 and 14 are thus subjected to pressure above that of the atmosphere they tend to straighten and thereby throw their free ends outwardly from their normal unstressed position a distance which is proportional to the respective pressures exerted upon the tubes through the pipes 44 and 45 and the nipples 15 and 16.

In the event either of the tubes 13 and 14 are subjected to "vacuum" by which is meant pressure below that of the atmosphere, the tube tends to contract and draw in the free end a distance proportional to the vacuum or drop in pressure. The Bourdon tube 14 is adapted to be connected by means of the nipple 16 and the pipe 44 with a selected high pressure point in a steam system not shown, while the Bourdon tube 13 is adapted for connection through its nipple 15 and the connecting pipe 45 with some selected low pressure point of the same system.

The high pressure Bourdon tube 14 is connected with a pointer 29 by actuating mechanism, preferably comprising a link 17a, a rack 18a, and a pinion 19a whereby the pointer 29 is rotated in accordance with the pressure upon the spring 14. The pointer 29 is for this purpose fixedly mounted upon one end of a shaft 20, the other end of the shaft having the pinion 19a fixedly mounted thereon. The low pressure Bourdon spring 13 is likewise connected with a pointer 36 by actuating means comprising a link 17b, a rack 18b and a pinion 19b. The racks 18a and 18b are each constructed in two sections having registering slots 51 in which a pair of screw bolts 50 are mounted. The bolts 50 clamp the sections of the racks 18a and 18b together and permit the effective lengths of the racks to be adjusted so as to cause proper registration under varying conditions of pressure. The pointer 36 is integrally formed with a ring 35 and is concentrically and rotatably mounted upon the shaft 20. The pinion 19b is fixedly mounted on the sleeve 21 thereby operatively connecting the spring 13 with the pointer 36.

The links 17a and 17b, the racks 18a and 18b, the pinions 19a and 19b, the shaft 20 and the sleeve 21 are supported in the housing 10 by a framework comprising a plate 23, bars 24 and spacers 25. A pair of hair springs 26 and 27 are each connected at their outer ends to one of a pair of pins 47 which are suitably mounted on one of the spacers 25. The inner end of the spring 26 is fastened to the sleeve 21 about which it is coiled and likewise the inner end of the spring 27 is fastened to the shaft 20 upon which it is mounted. The springs 26 and 27 furnish resistance which minimizes the minor oscillations of the pointers 29 and 36 which otherwise would result from sudden changes of pressure at the points of connection with the steam system. The springs 26 and 27 also serve to drag the pointers 29 and 36 back to zero readings under conditions of no pressure by overcoming the frictional resistance of the mechanism which connects the pointers with their respective actuating tubes 13 and 14.

The Bourdon tubes 13 and 14 are by this arrangement connected with the pointers 36 and 29, respectively, so that the tubes are each enabled to actuate their respective pointers independently of the condition or movement of the other tube. It follows that the pointers 29 and 36 are independently rotatable in accordance with the vacuum or pressure at the selected points in the pressure system with which the Bourdon tubes 13 and 14 are operatively connected.

The application of the device of my invention to a return vacuum and boiler pressure gauge is shown in Fig. 4 wherein the dial plate 31 is equipped with an annular scale 38 which is graduated on the right hand sector to show pressure in pounds above atmospheric pressure and on the left hand sector to show vacuum in inches as measured by a mercury column. The pointers 29 and 36 are respectively operatively connected as described with the pipes 44 and 45 which are respectively connected with the feed line and return pipe of a heating system (not shown).

When the heating system is in operation, with which the pipes 44 and 45 are connected, the pointer 29 will rotate clockwise to a reading corresponding with the pressure of the main pipe line in pounds above atmospheric pressure, but the vacuum pointer 36 will rotate only in a counter-clockwise direction to indicate a vacuum.

The return pipe pressure is measured in inches of mercury column, it being understood, that a vacuum pump or a similar device is operating to keep the return pipe at vacuum.

The differential reading of the two pointers 36 and 29 can be obtained by observing the position of the hair line 47 relative to the scale 46. The scale 46 is so graduated that the hair line 47 registers with the particular graduation corresponding to the differential between the two pointers 36 and 29. The right hand sector of the scale 38 is graduated to indicate steam pressure in pounds per square inch while the left hand sector is graduated to indicate inches of mercury column corresponding to vacuum in return pipe. As thus graduated the reading of the hair line 47 on the scale 46 measures a difference of conditions or a differential relation at the two points of the heating system with which the pointers 36 and 29 are operatively connected in inches of mercury column.

If for example there is atmospheric pressure (zero vacuum) in the return pipe with which the pointer 36 is connected and there is a pressure of five pounds above atmosphere in the feed line of the heating system, the hair-line 47 will register substantially with the number 10 on the scale 46, the number 10 being approximately the number of inches corresponding to five pounds of atmospheric pressure. If the pointer 36, for example, shows a vacuum of 10 inches in the return pipe when the pointer 29 shows a boiler pressure of five pounds, above atmospheric pressure, the hair-line 47 will be in substantial registry with the graduation 20 on the scale 46 thereby indicating a difference in inches of the two readings of 20. Since five pounds atmospheric pressure is substantially equivalent to a mercury column of 10 inches and the indicated 10 inches vacuum added to the calculated 10 inches above atmospheric pressure equals 20, it is obvious that the reading of the pointer 29 on the scale 46 corresponds to the calculated difference of the high and low pressure readings in inches of a column of mercury.

Thus it will be seen that my device as embodied in an application to a steam heating system enables the vacuum to be read in inches of a column of mercury, the boiler pressure to be read in pounds above atmospheric pressure and the differential between the aforesaid two readings to be read directly in inches of a column of mercury.

The annular differential scale which is designated as 34 in one embodiment and as 46 in another and which is rotatable with one of the pointers can be graduated in any desired way in accordance with a predetermined plan, and by properly correlating its graduations with the graduations of the direct reading indicating scales, the differential relation indicated on the differential scale may be read in the same units as the direct readings, or it may be graduated to read in different units of measure than indicated by the direct readings. The differential scale can likewise be graduated so as to express a ratio between the indicated readings of the pointers, in which event it could be called a percentage differential scale. For example the scale may be graduated to show percentage of relative humidity between the dry bulb bellows and the wet bulb bellows of a humidifying system.

Having thus described my invention, it is obvious that various immaterial modifications may be made in the same without de- parting from the spirit of my invention, hence I do not wish to be understood as limiting myself to the exact form, construction, arrangement and combination of parts herein shown and described for uses mentioned.

What I claim as new and desire to secure by Letters Patent is:

1. In a device of the kind described, a pair of concentrically mounted pointers, means operatively connecting said pointers with separate points of a closed pressure system and operable to rotate the pointers in accordance with the changing pressure conditions in said system at said points of connection, a dial plate having a plurality of graduations providing an annular scale over which said pointers are independently rotatable, said scale having a zero point with which said pointers register when the pressure is atmospheric at the points of connection with said system, said scale being so graduated that one of said pointers in moving from said zero point in one direction indicates increasing pressure in pounds and the other pointer in moving in the other direction indicates increasing vacuum in inches, and a second plate rotatable by and with the other of said pointers, said second plate having a plurality of graduations providing a scale on which the first mentioned of said pointers indicates in inches of mercury column the differential pressure conditions in said system at the respective points of connection of said pointers therewith.

2. In a device of the kind described, a pair of concentrically mounted pointers, a dial plate having a plurality of graduations providing an annular scale over which said pointers are independently rotatable, said scale being graduated to indicate boiler pressure in pounds in one direcion from a zero point and vacuum in inches in the other direction from said zero point, one of said pointers being rotatable over said vacuum graduations and the other over said pressure graduations, a plate rotatable by and with said vacuum indicating pointer, said plate having a plurality of graduations providing a scale on which the pressure indicating pointer indicates the differential readings of said pointers in inches of vacuum.

3. In a gauge of the kind described, a dial plate, the face of said plate having two groups of graduations arranged to provide a pair of abutting segmental annular scales, the graduations comprising said scales being numbered outwardly in opposite directions from zero at their common point of abutment, and numbered to indicate conditions by different systems of measurement, a pair of independently rotatable pointers having a common axis of rotation concentric with said scales, said pointers being separably connected with different parts of an energy system and rotatable in opposite directions from said zero point, means operable to rotate said pointers in accordance with changing energy conditions at the respective points of connection with said system, one of said pointers having a plate member fixedly attached thereto, said plate member having a group of graduations formed thereon to provide an annular scale concentric with said pointers and said first mentioned scales, said last mentioned scale having its graduations so positioned and numbered that the pointer independently movable relative thereto will indicate thereon the energy differential at the two points on said system in terms of one of said systems of measurement.

4. In a gauge of the kind described, a dial plate, the face of said plate having two groups of graduations arranged to provide a pair of abutting segmental annular scales, the graduations comprising said scales being numbered outwardly in opposite directions from zero at their common point of abutment and so numbered as to indicate conditions by different systems of measurement, a pair of independently rotatable pointers having a common axis of rotation concentric with said scales, said pointers being separably connected with different parts of a conduit forming a fluid pressure system and rotatable in opposite directions from said common zero point, means operable to rotate said pointers in accordance with changing pressure conditions at the respective points of connection with said conduit, one of said pointers having a plate member fixedly attached thereto, said plate member having a group of graduations formed thereon to provide an annular scale concentric with said pointers and said first mentioned scales, said last mentioned scale having its graduations so positioned and numbered that the pointer independently movable relative thereto will indicate thereon the pressure differential at the two points in said conduit in terms of one of said systems of measurement indicated by said mentioned scales.

5. In a gauge of the kind described, a dial plate, the face of said plate having two groups of graduations arranged to provide a pair of abutting segmental annular scales, the graduations comprising said scales being numbered outwardly in opposite directions from zero at their common point of abutment, one of said scales being so numbered as to indicate vacuum in inches and the other pressure in pounds, a pair of independently rotatable pointers having a common axis of rotation concentric with said scales, said pointers being separably connected with different parts of a conduit forming a fluid pressure system and rotatable in opposite directions from said common zero point, means operable to rotate said pointers in accordance with changing pressure conditions at the respective points of connection with said conduit, one of said pointers having a plate member fixedly attached thereto, said plate member having a group of graduations formed thereon to provide an annular scale concentric with said pointers and said first mentioned scales, said last mentioned scale having its graduations so positioned and numbered that the pointer independently movable relative thereto will indicate thereon the pressure differential at the two points in said conduit in terms of one of said systems of measurement.

In testimony whereof, I have hereunto signed my name.

GUY S. FABER.